US010394497B2

(12) United States Patent
Uchida

(10) Patent No.: US 10,394,497 B2
(45) Date of Patent: Aug. 27, 2019

(54) RELAY APPARATUS THAT REGISTERS USER INFORMATION INCLUDED IN A FORMING REQUEST IN A GROUP THAT INCLUDES THE ACCOUNT OF THE RELAY APPARATUS, CONTROL METHOD, AND STORAGE MEDIUM

(71) Applicant: CANON KABUSHIKI KAISHA, Tokyo (JP)

(72) Inventor: Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/948,148

(22) Filed: Apr. 9, 2018

(65) Prior Publication Data
US 2018/0293034 A1 Oct. 11, 2018

(30) Foreign Application Priority Data

Apr. 11, 2017 (JP) ................. 2017-078444

(51) Int. Cl.
*G06F 3/12* (2006.01)
*H04N 1/32* (2006.01)

(52) U.S. Cl.
CPC .......... *G06F 3/1213* (2013.01); *G06F 3/1207* (2013.01); *G06F 3/1231* (2013.01); *G06F 3/1255* (2013.01); *G06F 3/1256* (2013.01); *G06F 3/1269* (2013.01); *G06F 3/1288* (2013.01); *H04N 1/32411* (2013.01)

(58) Field of Classification Search
None
See application file for complete search history.

(56) References Cited

U.S. PATENT DOCUMENTS

| 5,193,152 A * | 3/1993 | Smith | ................. | H04L 41/00 |
| | | | | 709/220 |
| 2003/0202201 A1* | 10/2003 | Muto | ................. | G06F 3/1205 |
| | | | | 358/1.14 |
| 2005/0154739 A1* | 7/2005 | Ikai | .................. | H04L 63/08 |
| 2006/0047731 A1* | 3/2006 | Matsui | .............. | G06F 17/30011 |
| 2010/0245890 A1* | 9/2010 | Chakraborty | ......... | G06F 3/1204 |
| | | | | 358/1.15 |
| 2011/0075191 A1* | 3/2011 | Meunier | .............. | G06Q 10/107 |
| | | | | 358/1.15 |
| 2013/0148155 A1* | 6/2013 | Kitagata | ............... | G06F 3/1294 |
| | | | | 358/1.15 |
| 2013/0321832 A1* | 12/2013 | Sugiyama | .......... | H04N 1/00029 |
| | | | | 358/1.13 |

(Continued)

FOREIGN PATENT DOCUMENTS

JP 2015125528 A 7/2015

*Primary Examiner* — Miya J Williams
(74) *Attorney, Agent, or Firm* — Venable LLP

(57) ABSTRACT

A relay apparatus that is connected to a forming apparatus which forms a three-dimensional object and receives a forming request for the forming apparatus from a client terminal performs a registration process to a message service providing apparatus, in response to a reception of a forming request including user information from the client terminal, so that a group, which includes the user information, user information of other users and an account of the relay apparatus, is managed by the message service providing apparatus, and distributes a message concerning the forming apparatus and the forming request for the group.

10 Claims, 12 Drawing Sheets

(56) References Cited

U.S. PATENT DOCUMENTS

| | | | |
|---|---|---|---|
| 2014/0029042 A1* | 1/2014 | Yoshida | H04N 1/00068 358/1.14 |
| 2017/0180292 A1* | 6/2017 | Taniguchi | H04L 51/14 |
| 2017/0265515 A1* | 9/2017 | Davila | A23G 3/28 |
| 2018/0173470 A1* | 6/2018 | Maekawa | G06F 3/126 |

* cited by examiner

_US 10,394,497 B2_

RELAY APPARATUS THAT REGISTERS USER INFORMATION INCLUDED IN A FORMING REQUEST IN A GROUP THAT INCLUDES THE ACCOUNT OF THE RELAY APPARATUS, CONTROL METHOD, AND STORAGE MEDIUM

BACKGROUND OF THE INVENTION

Field of the Invention

The present invention relates to a relay apparatus, a control method, and a storage medium.

Description of the Related Art

In recent years, forming apparatuses that forms three-dimensional objects, that is, so-called three-dimensional (3D) printers, have been widely used.

Also, sharing information by using a social networking service (SNS) has been widely used. Japanese Patent Laid-Open No. 2015-125528 discloses an electronic device management system that transmits device states of an image forming apparatus to a follower who is a user of the image forming apparatus by using an SNS.

Unlike a printing apparatus that performs printing on a paper medium or the like, a forming apparatus requires a long forming time and processing before and after forming. For example, before forming, it may be necessary to perform pre-processing such as replacement, replenishment, or the like of a material according to a three-dimensional object to be formed hereafter. Furthermore, for example, after forming, it may be necessary to perform post-processing such as taking out a three-dimensional object and cleaning nozzles. In other words, a forming apparatus cannot process a plurality of forming jobs continuously without manual intervention.

When a forming apparatus is shared among a plurality of users, the users do not know the times at which their forming jobs have been completed and whether it is necessary to perform post-processing. Furthermore, the users do not know the times at which their forming jobs can be started, that is, the times at which pre-processing needs to be performed. For this reason, there may be a vacant interval between the end of a forming job and the start of the next forming job and it takes some time to complete a plurality of forming jobs in some cases.

SUMMARY OF THE INVENTION

The present invention provides a relay apparatus capable to efficiently use a forming apparatus with a plurality of users.

A relay apparatus according to an embodiment of the present invention is connected to a forming apparatus which forms a three-dimensional object and receives a forming request for the forming apparatus from a client terminal, the relay apparatus comprising; a memory storing instructions; and a processor executing the instructions causing the relay apparatus to: perform a registration process to a message service, in response to a reception of a forming request including user information from the client terminal, so that a group, which includes the user information, user information of other users and an account of the relay apparatus, is managed by the message service; and distribute a message concerning the forming apparatus and the forming request for the group.

Further features of the present invention will become apparent from the following description of exemplary embodiments (with reference to the attached drawings).

DESCRIPTION OF THE EMBODIMENTS

Hereinafter, preferred embodiments of the present invention will be described with reference to attached drawings and the like.

First Embodiment

\<System Configuration\>

Figure 1:
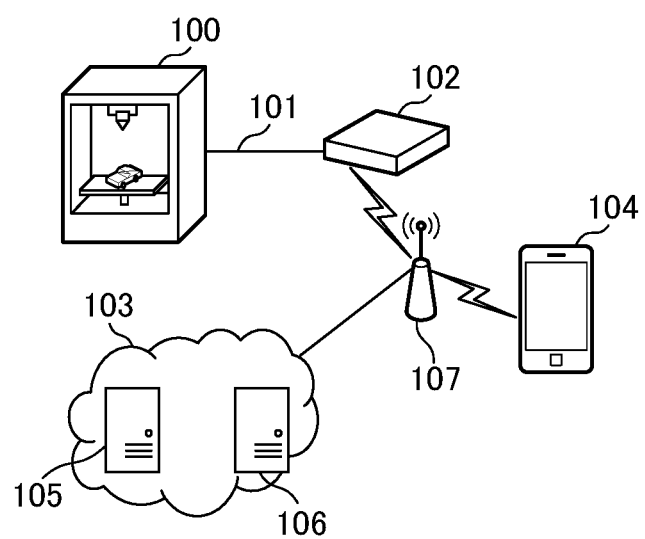
FIG. 1 is a diagram illustrating an example of a configuration of a forming system according to an embodiment of the present invention.

FIG. 1 is a diagram illustrating an example of a configuration of a forming system according to an embodiment of the present invention.

The forming system includes a forming apparatus 100, a relay apparatus 102, a client terminal 104, a printing service providing apparatus 105, and a message service providing apparatus 106.

The forming apparatus 100 is an apparatus that forms a three-dimensional object. The relay apparatus 102 is an information device that is connected to the forming apparatus 100 through a communication medium 101 such as a universal serial bus (USB) and receives a forming request (forming job) causing the forming apparatus 100 to perform forming from the client terminal 104.

The relay apparatus 102 and the client terminal 104 are connected through a wireless communication medium 107 or the like. The relay apparatus 102 is also connected to a network 103 such as the Internet or an intranet via the wireless communication medium 107 or the like. Note that, although the forming apparatus 100 and the relay apparatus 102 are described as independent apparatuses in the embodiment, a configuration in which the relay apparatus 102 is built into the forming apparatus 100 may be adopted. Furthermore, a plurality of forming apparatuses 100 may be connected to the relay apparatus 102.

The client terminal 104 transmits a forming request (forming job) for forming a three-dimensional object to the forming apparatus 100 via the relay apparatus 102. The client terminal 104 is connected to the network 103 or the relay apparatus 102 via the wireless communication medium 107 or the like. Note that, although only one client terminal 104 is illustrated in FIG. 1, a plurality of client terminals 104 can be connected to the network 103 or the relay apparatus 102 via the wireless communication medium 107.

The network 103 includes the printing service providing apparatus 105 that causes the forming apparatus 100 to perform printing, and the message service providing apparatus 106 that provides a social network server (SNS), and the like. Note that, although the relay apparatus 102 and the printing service providing apparatus 105 are described as independent apparatuses in the embodiment, a configuration in which functions of the printing service providing apparatus 105 are built into the relay apparatus 102 may be adopted.

<Hardware Configuration>

Figure 2:
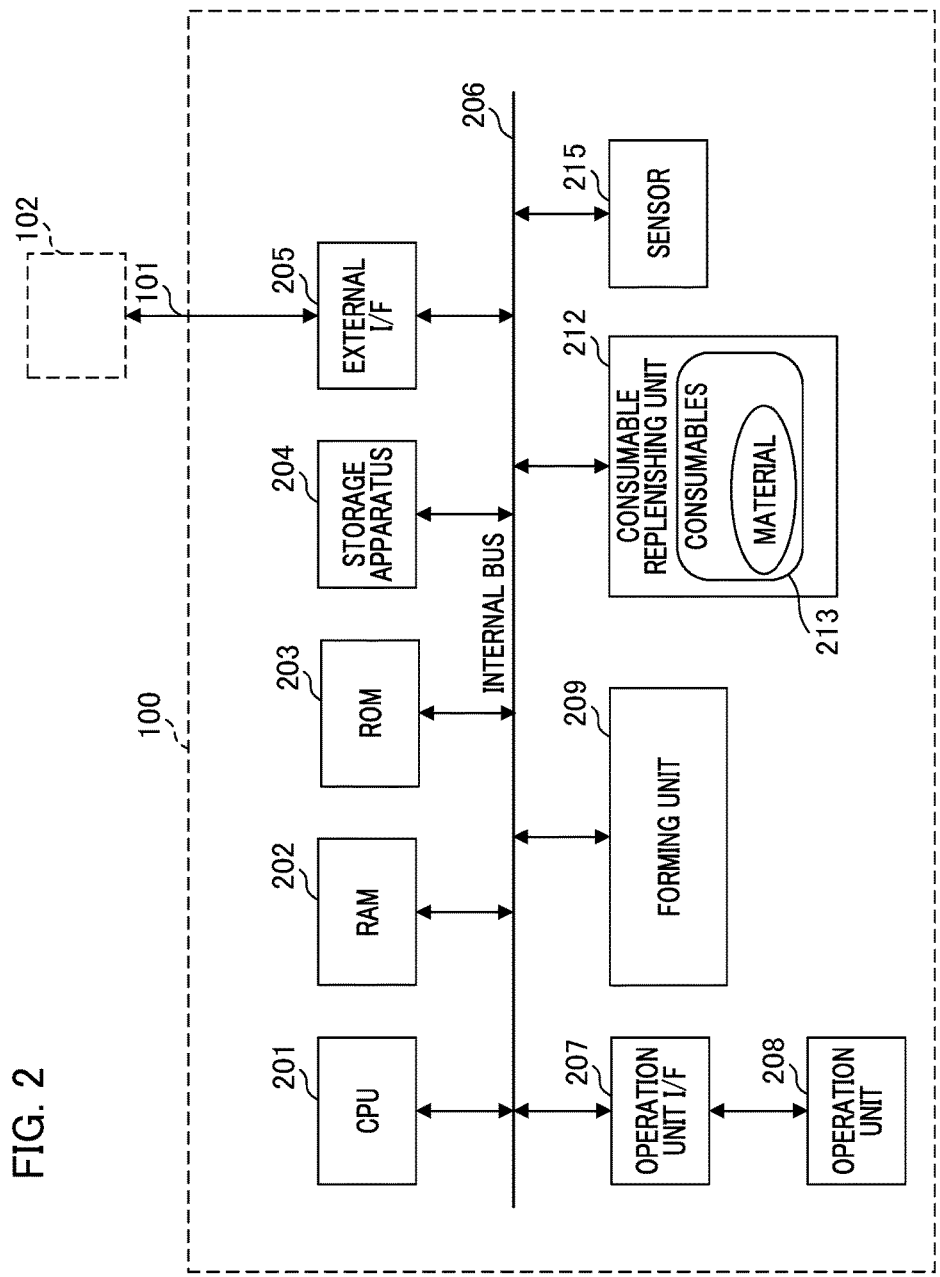
FIG. 2 is a diagram illustrating an example of a hardware configuration of a forming apparatus.

FIG. 2 is a diagram illustrating an example of a hardware configuration of the forming apparatus 100.

A central processing unit (CPU) 201 collectively controls each device via an internal bus 206 by executing a program stored in a read only memory (ROM) 203 or a storage apparatus 204. A random access memory (RAM) 202 functions as a memory or a work area of the CPU 201.

The ROM 203 has an embedded program and data recorded thereon. The ROM 203 also stores individual identification information, model information, or the like of the forming apparatus 100. An external interface (I/F) 205 is used for one way or two way data exchange with the relay apparatus 102 via the communication medium 101. The storage apparatus 204 can function as an external storage apparatus, store forming data or the like, and store operation information or information concerning consumables detected and recorded in the forming apparatus 100 instead of the RAM 202. Operation information includes fault information, status information, log information, or the like.

An operation unit 208 is responsible for an input/output in the forming apparatus 100. To be specific, the operation unit 208 receives an input such as a button input from a user and transfers a signal corresponding to the input to each processing unit described above through an operation unit I/F 207. The operation unit 208 also includes a display apparatus that provides necessary information to the user or receives the user's operation. Examples of the display apparatus include a touch panel or the like.

A forming unit 209 includes a dedicated controller that includes a memory and a processor for controlling a forming process depending on an additive manufacturing and a stage on which a material is repeatedly layered to produce a three-dimensional object. The forming unit 209 also has equipment and a configuration depending on the additive manufacturing for layering of a material, solidification or finishing of a three-dimensional object, and/or forming of a support member for the object.

Examples of the additive manufacturing to which the present invention can be applied include a thermal melting and stacking method known as Fused deposition modeling (FDM), Stereolithography (SLA), Selective laser sintering (SLS), an ink jet system, and the like. The repeated layering of the material by the forming unit 209 are executed using a forming command corresponding to cross-sectional shape data of each layer (that is, slice data) generated from model data or the like by a 3D print application installed in the client terminal 104.

A consumables replenishing unit 212 supplies consumables including a material 213 necessary for producing a three-dimensional object to the forming unit 209. In the forming apparatus 100 in which an additive manufacturing method for forming a support member is adopted when a three-dimensional object is produced, the consumables replenishing unit 212 stores the support member as a consumable and supplies the support member to the forming unit 209. Examples of the material 213 include a photocurable resin, a thermoplastic resin, a metal powder, a plaster, and the like. Examples of the photocurable resin include a liquid resin cured through irradiation with ultraviolet rays or the like.

The consumables replenishing unit 212 can also manage an amount of supply of the material 213, the support member, or the like to the forming unit 209. An amount of supply is recorded in the storage apparatus 204 as a log. In a log to be recorded, an amount of supply for each one three-dimensional object (one forming job) to be three-dimensionally formed is recorded for one record. In addition, for the log recording, it is also possible to record the supply amount in a predetermined period in addition to for each three-dimensional object.

If the forming apparatus 100 can perform colored forming with a plurality of colors, the consumables replenishing unit 212 can replenish materials 213 with a plurality of colors to the forming unit 209 and can individually manage an amount of supply for each color. Moreover, the amounts of supply can be recorded in the storage apparatus 204 as logs. Note that consumables are replenished to the consumables replenishing unit 212 using a bottle having a material 213 such as a liquid or a powder contained therein attached to the consumables replenishing unit 212. Alternately, consumables may be manually replenished from a dedicated bottle or the like to the consumables replenishing unit 212.

A plurality of sensors 215 are disposed in the forming apparatus 100 and each of the sensors 215 has a respective purpose. The main sensors among the sensors disposed in the forming apparatus 100 will be described below as examples. A certain sensor detects an amount of consumables supplied to the forming unit 209 managed by the consumables replenishing unit 212 or detects an amount of the remaining consumables held by the consumables replenishing unit 212. Furthermore, a sensor for detecting an attached bottle having a material 213 contained therein and detecting identification information or the like of the bottle may be disposed in the forming apparatus 100.

A sensor for detecting a temperature abnormality, a failure, or the like in the forming unit 209 may be disposed. When a forming head or a stage for performing forming is provided in the forming unit 209, a sensor for counting the number of driving times (movement distance) of the forming head or the stage may be arranged in the forming unit 209. Note that, although an example in which the sensors are arranged as hardware has been described above, some or all of the sensors may be replaced with software sensors having equivalent detection functions.

The forming apparatus 100 can also include, as optional devices, incidental facilities necessary in accordance with an additive manufacturing method and peripheral devices (not shown) that expand functions and mechanisms of the forming apparatus 100 such as a camera or an integrated circuit (IC) card reader. Examples of incidental facilities include an apparatus necessary for countermeasures in response to powder in the case of an ink jet system, a cleaning apparatus necessary in the case of SLA, or the like.

Figure 3:
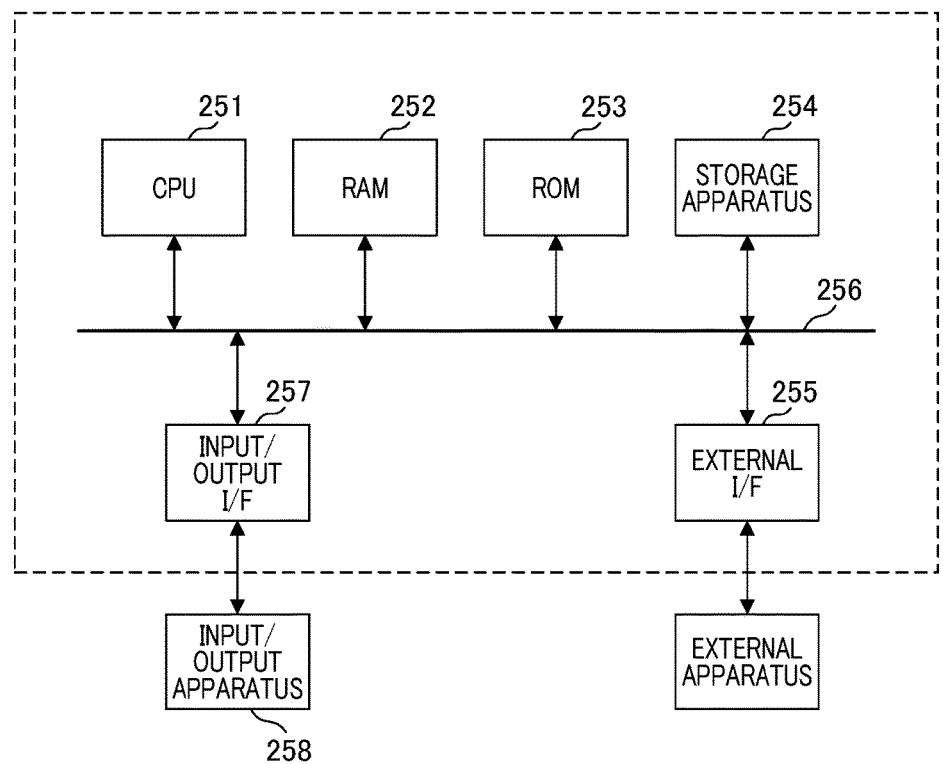
FIG. 3 is a diagram illustrating an example of a hardware configuration of an information processing apparatus including a relay apparatus.

FIG. 3 is a diagram illustrating an example of a hardware configuration of an information processing apparatus that includes the relay apparatus 102, the client terminal 104, the printing service providing apparatus 105, and the message service providing apparatus 106.

A CPU 251 controls the entire information processing apparatus via an internal bus 256 by executing a program or the like stored in a ROM 253 or a storage apparatus 254. The ROM 253 or the storage apparatus 254 also stores a variety of data in addition to a program. For example, the storage apparatus 254 may store device information, operation information, or the like of the forming apparatus 100. A RAM 252 functions as a memory or a work area for the CPU 251.

Examples of an input/output I/F 257 include a PS2, a USB, an analog or digital display I/F, and the like. Examples of an input/output apparatus 258 include a keyboard, a mouse, a cathode-ray tube (CRT), a liquid crystal display, and the like. The input/output apparatus 258 can be connected to the information processing apparatus via the input/output I/F 257. The information processing apparatus performs communication via the network 103 through an external I/F 255. Note that a plurality of external I/Fs 255 may be provided and a configuration in which communication via each of the network 103 and the communication medium 101 is possible may be adopted.

The ROM 253 stores an initial program for starting up the information processing apparatus or a basic program for controlling each module of the information processing apparatus. The storage apparatus 254 stores an operating system (OS) or an application. When the information processing apparatus is turned on, first, a program (boot loader) for starting up a computer stored in the ROM 253 is executed, the program loads the OS stored in the storage apparatus 254 into the RAM 252, and the OS is authorized to control the computer.

The OS further reads necessary modules or drivers from the storage apparatus 254 into the RAM 252. The OS also reads a necessary application from the storage apparatus 254 into the RAM 252 in response to a user's instruction and executes the application. In the embodiment, the CPU 251 loads the program stored in the storage apparatus 254 of the information processing apparatus into the RAM 252 and executes the program so that the processing for an information processing apparatus described below is realized.

<Software Configuration>

Figure 4:
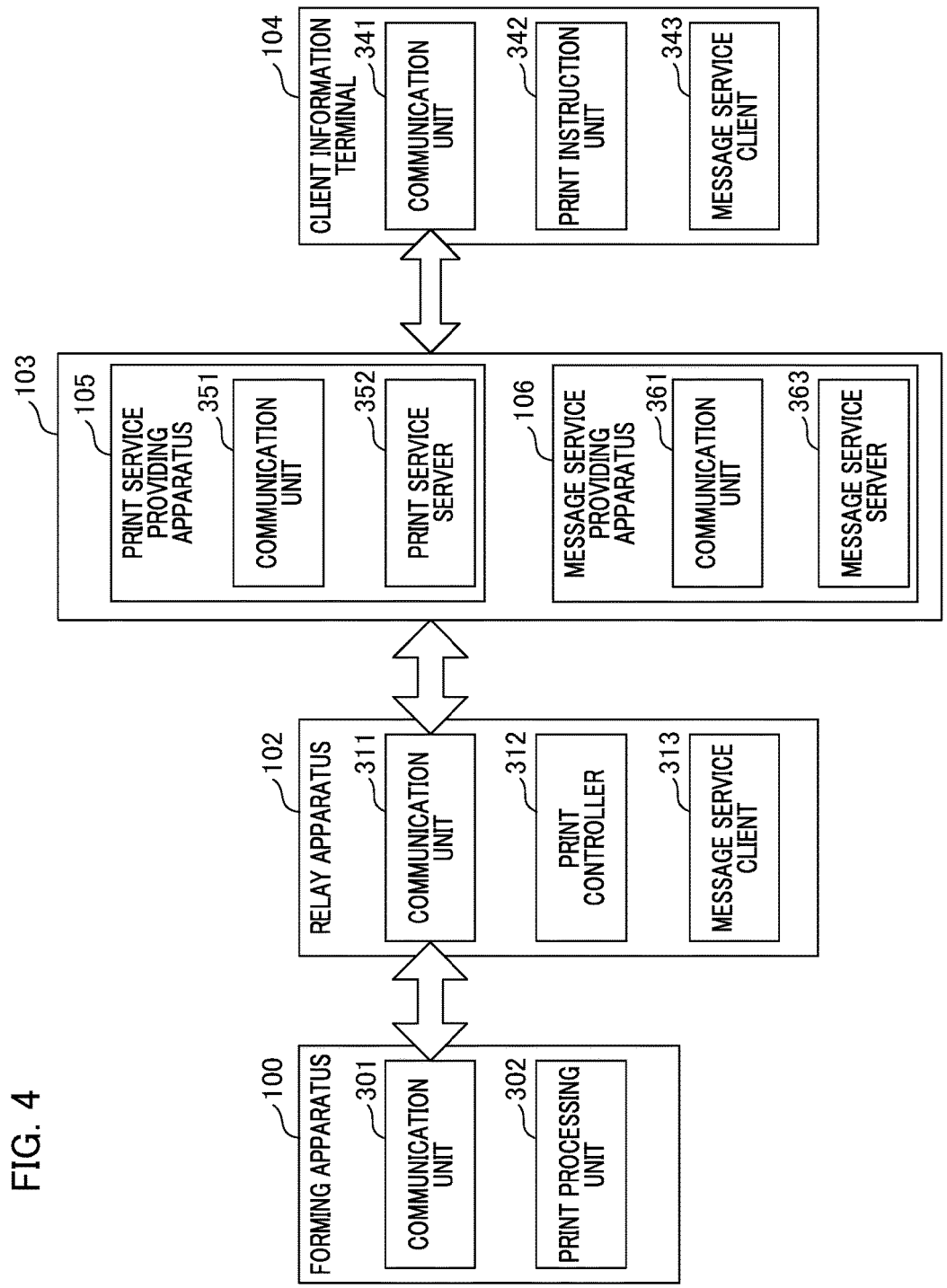
FIG. 4 is a diagram illustrating an example of a software configuration of each apparatus constituting the forming system.

FIG. 4 is a diagram illustrating an example of a software configuration of each apparatus constituting the forming system according to the embodiment.

The forming apparatus 100 includes a communication unit 301 and a print processing unit 302. The communication unit 301 communicates with the relay apparatus 102 through the communication medium 101. The print processing unit 302 performs a forming job in the forming apparatus 100 and outputs a three-dimensional object.

The relay apparatus 102 includes a communication unit 311, a print controller 312, and a message service client 313. The communication unit 311 communicates with the forming apparatus 100 through the communication medium 101 and communicates with other apparatuses through the network 103. The print controller 312 transmits a forming job received from the printing service providing apparatus 105 to the forming apparatus 100.

The print controller 312 also manages a status (state) of the forming apparatus 100 or a forming job for the forming apparatus 100. The message service client 313 performs a process for processing for exchanging messages with other message service clients via the message service providing apparatus 106.

The printing service providing apparatus 105 includes a communication unit 351 and a print service server 352. The communication unit 351 communicates with other apparatuses through the network 103. The print service server 352 performs job management for causing the forming apparatus 100 to process a forming job in response to a request from the client terminal 104.

The message service providing apparatus 106 includes a communication unit 361 and a message service server 363. The communication unit 361 communicates with other apparatuses through the network 103. The message service server 363 controls the message service clients 313 and 343 of the relay apparatus 102 and the client terminal 104 such that they exchange messages with each other.

The client terminal 104 includes a communication unit 341, a print instruction unit 342, and a message service client 343. The communication unit 341 communicates with other apparatuses through the network 103. The print instruction unit 342 transmits a forming request to the relay apparatus 102 via the print service server 352.

Note that, in the embodiment, the forming job transmitted from the client terminal 104 to the print service server 352 includes model data written in a format for model data (3D data) such as a 3D manufacturing format (3MF) or a standard template library (STL). Furthermore, the forming apparatus 100 performing forming and the forming details are designated in response to a forming request. The message service client 343 performs a process for exchanging messages with other message service clients via the message service providing apparatus 106.

<Processing in Relay Apparatus>

Figure 5:
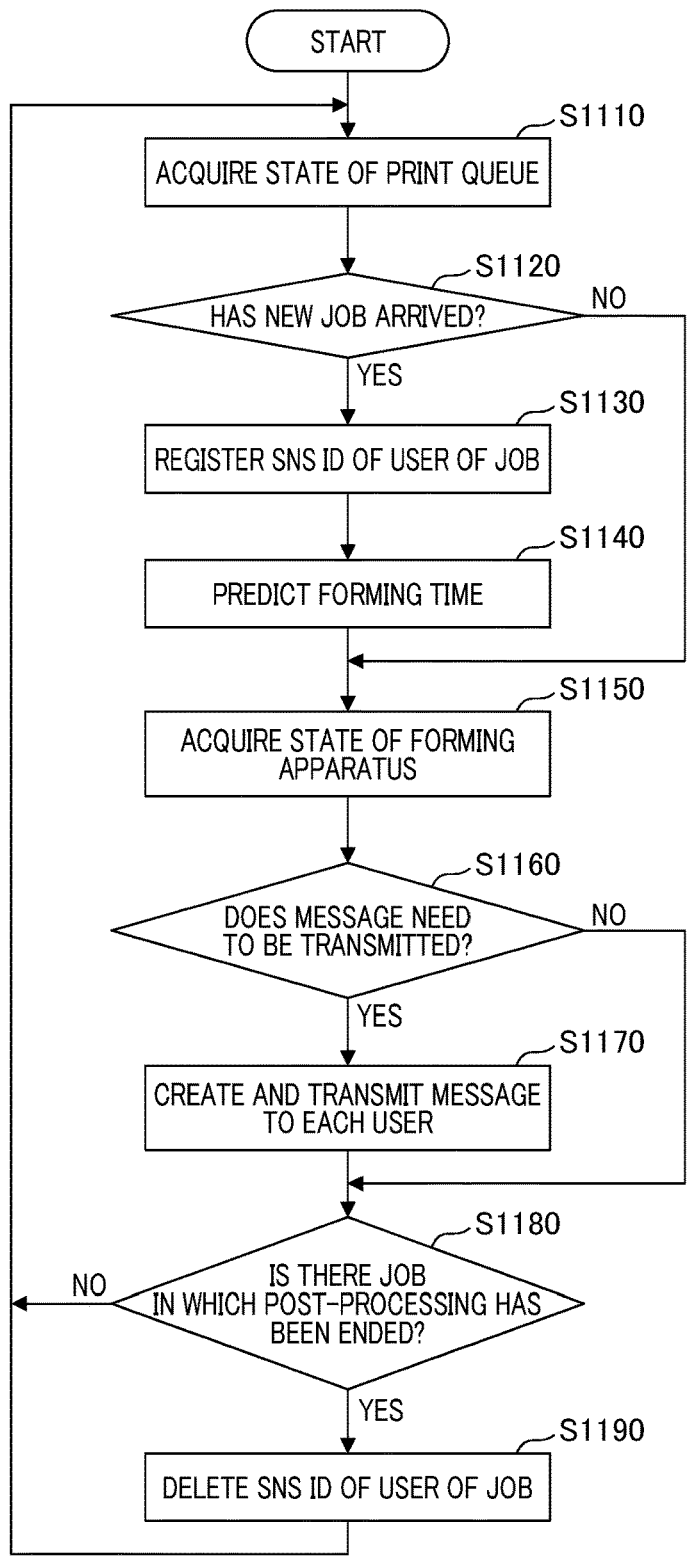
FIG. 5 is a flowchart for describing a process in which a relay apparatus distributes a message to a user.

FIG. 5 is a flowchart for describing a process in which the relay apparatus 102 distributes a message to a user who has transmitted (input) a forming job using an SNS.

In Step S1110, the print controller 312 of the relay apparatus 102 acquires and monitors a state of its own print queue. Note that either the relay apparatus 102 side or the printing service providing apparatus 105 side may have a print queue in accordance with a printing service to be used.

In Step S1120, the print controller 312 determines whether or not a new forming job has been input to the print queue. If it is confirmed that a new forming job has been input to the print queue, the process proceeds to a process of Step S1130 and if it is confirmed that a new forming job has not been input to the print queue, the process proceeds to a process of Step S1150.

In Step S1130, the print controller 312 extracts user information of the user who has input the new forming job, that is, an owner of the forming job, from the confirmed new forming job. In the embodiment, the user information is assumed to be, for example, an identifier (ID) of an SNS. Moreover, the print controller newly registers the extracted user information for the message service providing apparatus 106 as a communication destination of a message of the message service client 313. In Step S1140, the print controller 312 predicts a forming time on the basis of the form contents of the input forming job, the performance of the forming apparatus 100 performing forming, or the like.

In Step S1150, the print controller 312 acquires and monitors information indicating a state of the forming apparatus 100 or each forming job. Note that the process of Step S1120 is performed regardless of whether or not a new forming job has been confirmed in the print queue. In other words, the relay apparatus 102 monitors a state of its own print queue in Step S1110 and monitors a state of the forming apparatus 100 or each forming job.

In Step S1160, the print controller 312 determines whether or not a message needs to be transmitted to a user who has input each forming job in accordance with the information acquired in Step S1150. To be specific, it may be determined that, when the forming apparatus 100 performing the forming job or the forming job is in a predetermined state, a message corresponding to the state needs to be transmitted to the user who has input the forming job.

The relay apparatus 102 manages associating each state in which a message needs to be transmitted with a message corresponding to the state. Specific examples in which the forming apparatus 100 or the forming job is in a predetermined state in a case in which it is determined that a message needs to transmitted will be described below with reference to FIG. 6.

If it is determined in Step S1160 that a message needs to be transmitted, the process proceeds to a process of Step S1170. In addition, if it is determined that a message does not need to be transmitted, the process proceeds to a process of Step S1180. In Step S1170, the print controller 312 creates a message corresponding to a predetermined state of the forming apparatus 100 or the forming job. The message service client 313 distributes (transmits) the created message to a user with an ID of an SNS of an owner of the forming job registered in Step S1130.

Figure 6:
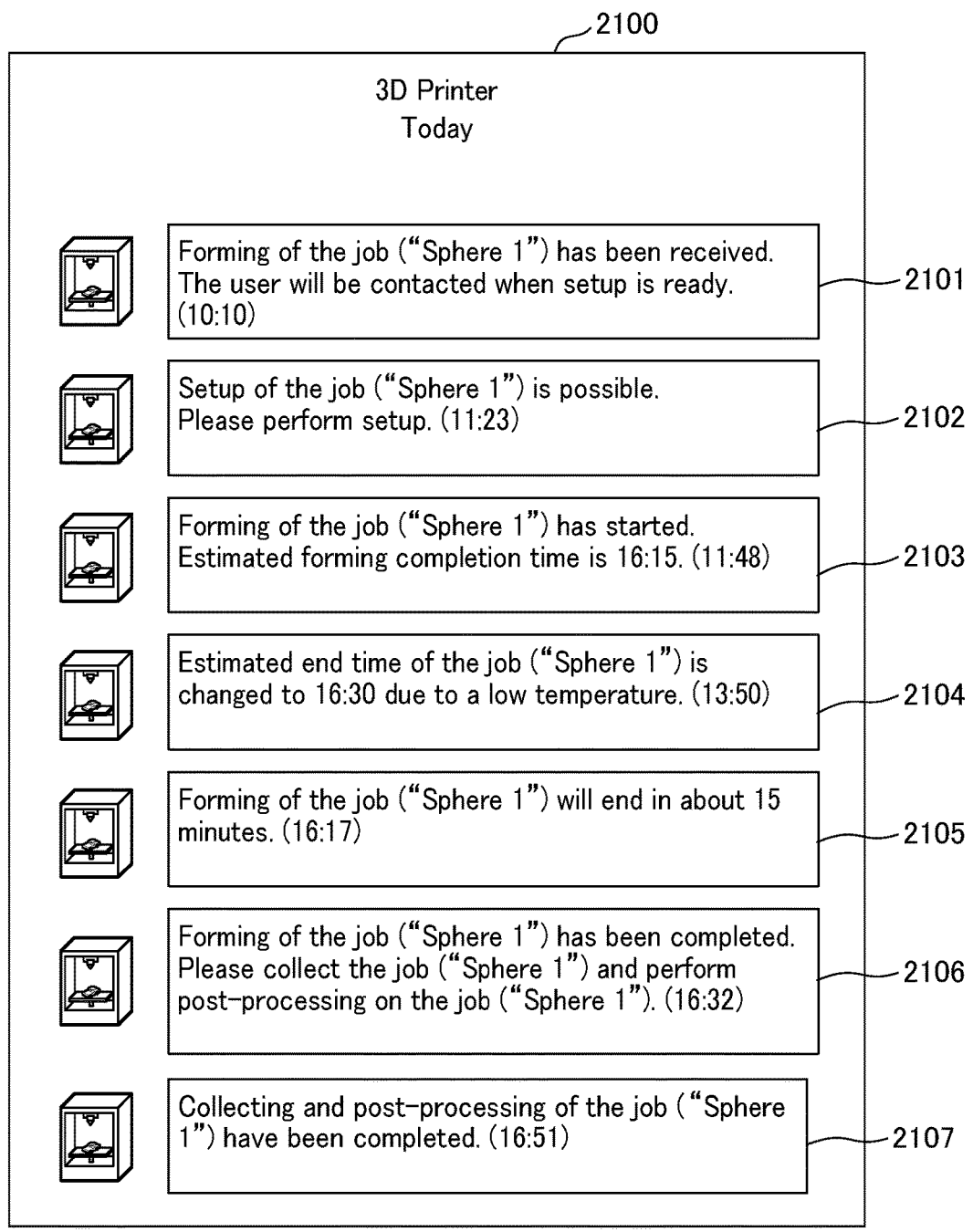
FIG. 6 is a diagram illustrating an example of a screen provided by a message service providing apparatus.

FIG. 6 illustrates an example of a screen displayed by the client terminal 104 of a user who has input a forming job, that is, an owner of the forming job, as a result of distributing a message in Step S1170.

Note that, in the embodiment, it is assumed that the relay apparatus 102 has an account (ID of an SNS) corresponding to the forming apparatus 100 and the user has performed setting to be able to receive a message from the account of the relay apparatus 102 in advance. In the relay apparatus 102, messages are exchanged between the user and the forming apparatus 100 using this account.

As described above, the print controller 312 of the relay apparatus 102 creates a message according to a state of the forming apparatus 100 performing the forming job or the forming job for a user who has input a forming job and distributes the created message to a user with an ID of the user. An example of a message created in accordance with a state of the forming apparatus 100 or the forming job and transmitted to the user will be described below.

A message 2101 is a message transmitted to the user in a case in which a new forming job is received by the forming apparatus 100 when the forming job is input to the print queue of the relay apparatus 102. To be specific, a message, i.e., "forming of the job ('Sphere 1') has been received. The user will be contacted when setup is ready." may be transmitted.

Note that the text of a message, the time at which the forming job has been actually received, and the time at which the text of a message has been created, or the like may be displayed. Furthermore, all of the message 2101 and other messages which will be described below are merely examples and the present invention is not limited thereto. A state of the forming apparatus 100 or the forming job when the message is transmitted and the contents of a message corresponding to each state are not limited.

A message 2102 is a message transmitted to the user when post-processing related to a forming job performed before the forming job input by the user is completed and pre-processing of a forming job input in the forming apparatus 100 becomes possible. For example, a message, i.e., "Pre-processing for a job is available. Please perform pre-processing." may be transmitted. A message 2103 is a message transmitted to the user when performing of the forming job input by the user is started. To be specific, a message, i.e., "Forming of the job ("Sphere 1") has started. An estimated forming completion time is 16:15." may be transmitted.

A message 2104 is a message transmitted to the user when the predicted end time of the forming job input by the user has been changed due to a certain cause. To be specific, a message, i.e., "An estimated end time of the job ("Sphere 1") is changed to 16:30 due to a low temperature." is transmitted. A message 2105 is a message transmitted to the user a predetermined time before an estimated end time of the forming job input by the user. To be specific, when a predetermined time is set to 15 minutes, a message, i.e., "Forming of the job ("Sphere 1") will end in about 15 minutes." is transmitted.

A message 2106 is a message transmitted to the user when the forming job input by the user has been completed. To be specific, a message, i.e., "Forming of the job ("Sphere 1") has been completed. Please collect the job ("Sphere 1") and perform post-processing on the job ("Sphere 1")." is transmitted. A message 2107 is a message transmitted to the user when the post-processing for the forming job input by the user has been completed. To be specific, a message, i.e., "Collecting and post-processing for the job ("Sphere 1") have been completed." is transmitted.

Figure 13:
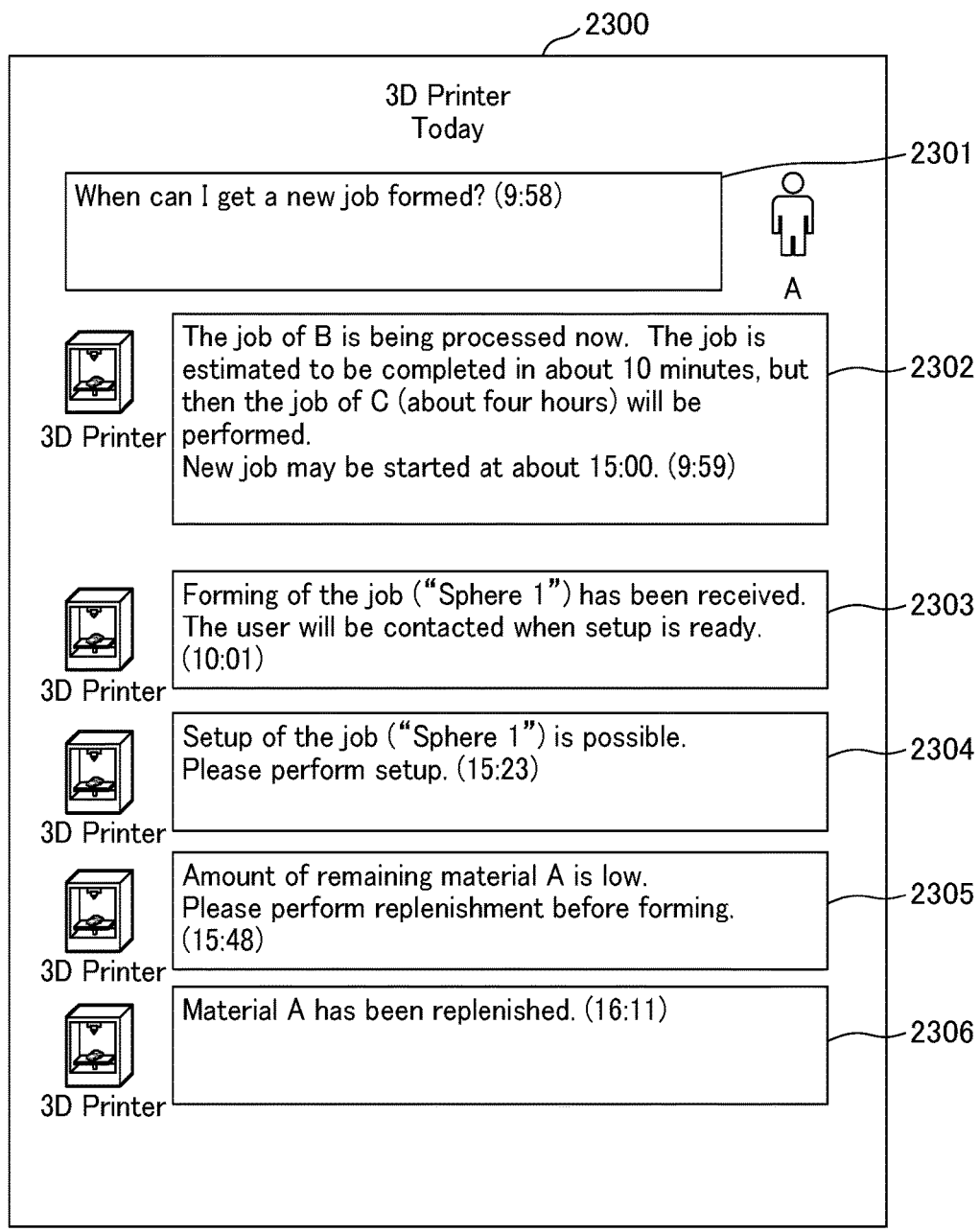
FIG. 13 is a diagram illustrating an example of a screen provided by the message service providing apparatus.

Note that the messages illustrated in FIG. 6 are merely examples and the present invention is not limited thereto. For example, it is effective to remind the user of the post-processing by distributing such a message when the post-processing has not been performed even though the forming job has been completed and then a predetermined time has passed. For example, it is also effective to distribute a message concerning an estimated start time for the forming job so that the user quickly performs the pre-processing. Furthermore, for example, a message or the like concerning a state of a material used in the forming apparatus 100 may be distributed as a state of the forming apparatus 100. Examples of other messages are illustrated in FIG. 13 which will be described below.

Returning to the description in FIG. 5, in Step S1180, the print controller 312 determines whether or not there is a forming job in which post-processing such as nozzle cleaning has been completed. If it is determined that there is a forming job in which post-processing has been completed, the process proceeds to a process of Step S1190. In addition, if it is determined that there is no forming job in which the post-processing has been completed, the process returns to the process of Step S1110 and the print controller 312 continues to monitor the print queue and the states of the forming apparatus and the forming job.

In Step S1190, the print controller 312 deletes the user information of the user who has input the forming job for which the post-processing has been completed. In other words, the user information of the user who has input the forming job registered in Step S1130 is erased when the post-processing for the forming job is completed. This is because it becomes unnecessary to transmit a new message to the user who has input the forming job.

As described above, according to the embodiment, the user who has input the forming job can see a progress status for his/her own forming job or a state of the forming apparatus and can ascertain a timing at which pre-processing, post-processing, or the like related to forming has to be performed. Thus, when a plurality of forming jobs are performed, a vacant interval between the end of a forming job and the start of the next forming job can be prevented and a plurality of users can efficiently use the forming apparatus.

Second Embodiment

In the first embodiment, the relay apparatus 102 distributes the messages related to the forming apparatus 100 or the forming job to the user who has input the forming job. In the first embodiment, for each user, the messages related to the user's forming job are distributed. For this reason, for example, when a specific user does not perform pre-processing or post-processing at an appropriate timing, a non-working time is likely to be present between a previous forming job and the next forming job after the user's forming job. In such a case, a plurality of forming jobs cannot be performed efficiently in the forming apparatus 100.

On the other hand, a mechanism in which a user who has input a forming job receives the distribution of messages related to a forming job associated with his/her own forming job as well using a group function of an SNS will be described in this embodiment. In other words, messages related to the forming apparatus 100 and a plurality of forming jobs performed by the forming apparatus can be shared between a plurality of users. A case in which two types of groups of SNSs are registered will be described below.

One of the groups of SNSs is a group in which the group for each forming apparatus 100 is registered for the message service providing apparatus 106 and which is constituted to include a user who has input a forming job for the same forming apparatus 100 in the same group. In other words, the group is a group constituted of the forming apparatus 100 and the users who use the forming apparatus 100. Hereinafter, such a group is referred to as a user group.

In the case of the other group, the group for each forming job is registered (created) for the message service providing apparatus 106. The registered group is constituted to include a user who has input a forming job and a user who has input a forming job performed by the forming apparatus performing a forming job before the forming job. In other words, the other group is a group constituted of the forming apparatus 100 and the users who have input two consecutive unfinished forming jobs in the forming apparatus. Hereinafter, such a group is referred to as a job group. Furthermore, hereinafter, consecutive forming jobs in one forming apparatus are simply referred to as consecutive jobs.

Note that it is assumed that a configuration, a hardware configuration, and a software configuration of a forming system in the embodiment are the same those in the first embodiment. Thus, in the embodiment, constituent elements that are the same as those of the first embodiment will be denoted with the same reference numerals and description thereof will be omitted.

<Case in which User Group is Used>

Figure 7:
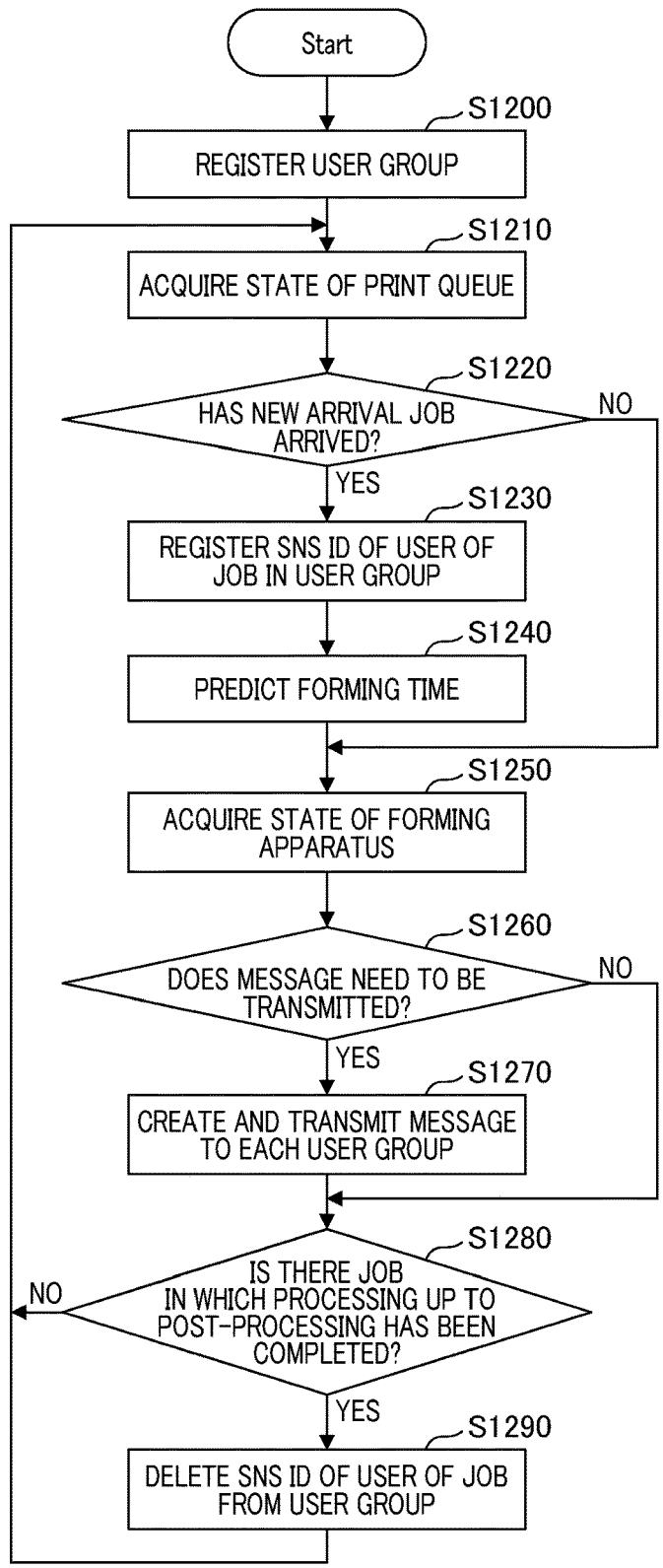
FIG. 7 is a diagram illustrating a process of distributing a message using a user group.

FIG. 7 is a flowchart for describing a process in which the relay apparatus 102 registers a user group of the forming apparatus 100 using a group function of an SNS and distributes messages to the user group.

In Step S1200, the print controller 312 of the relay apparatus 102 registers a user group of the forming apparatus 100 including an account of a started forming apparatus 100 via the message service client 313 simultaneously with the startup of the forming apparatus 100. Note that, like in the case of the first embodiment, it is assumed that the relay apparatus 102 has an account corresponding to the forming apparatus 100. Furthermore, when a user group of the forming apparatus 100 has already been registered, no new user group is registered.

Since processes of Steps S1210 and S1220 are the same as the processes of Steps S1110 and S1120 in FIG. 5 in the first embodiment, description thereof will be omitted. In Step S1230, the print controller 312 extracts user information of a user who has input a forming job from a confirmed new forming job. In the embodiment, examples of user information include an ID of an SNS. Moreover, the print controller 312 registers the extracted user information in the user group of the forming apparatus 100 performing a forming job, which has been registered in Step S1200.

The print controller 312 registers a user in the corresponding user group of the forming apparatus 100 so that the user can view or post messages exchanged with the user group via the message service client 343 of the client terminal 104. In other words, messages related to the forming apparatus 100 and a plurality of forming jobs performed by the forming apparatus 100 can be shared among a plurality of users.

Since processes of Steps S1240 and S1250 are the same as the processes of Steps S1140 and S1150 in FIG. 5 in the first embodiment, description thereof will be omitted. In Step S1260, the print controller 312 determines whether or not a message needs to be transmitted to a user group registered in Step S1200 in accordance with information acquired in Step S1250.

To be specific, when the forming apparatus 100 or a forming job performed by the forming apparatus 100 is in a predetermined state, it may be determined that a message corresponding to the state needs to be transmitted to the user group of the forming apparatus 100. Specific examples in which the forming apparatus 100 or the forming job is in a predetermined state in a case in which it is determined that a message needs to be transmitted are the same as in the first embodiment.

In Step S1260, if it is determined that a message needs to be transmitted, the process proceeds to a process of Step S1270 and if it is determined that a message does not need to be transmitted, the process proceeds to a process of Step S1280. In Step S1270, the print controller 312 creates a message corresponding to a predetermined state of the forming apparatus 100 or the forming job. The message service client 313 distributes the created message to the user group of the corresponding forming apparatus 100.

Figure 9:
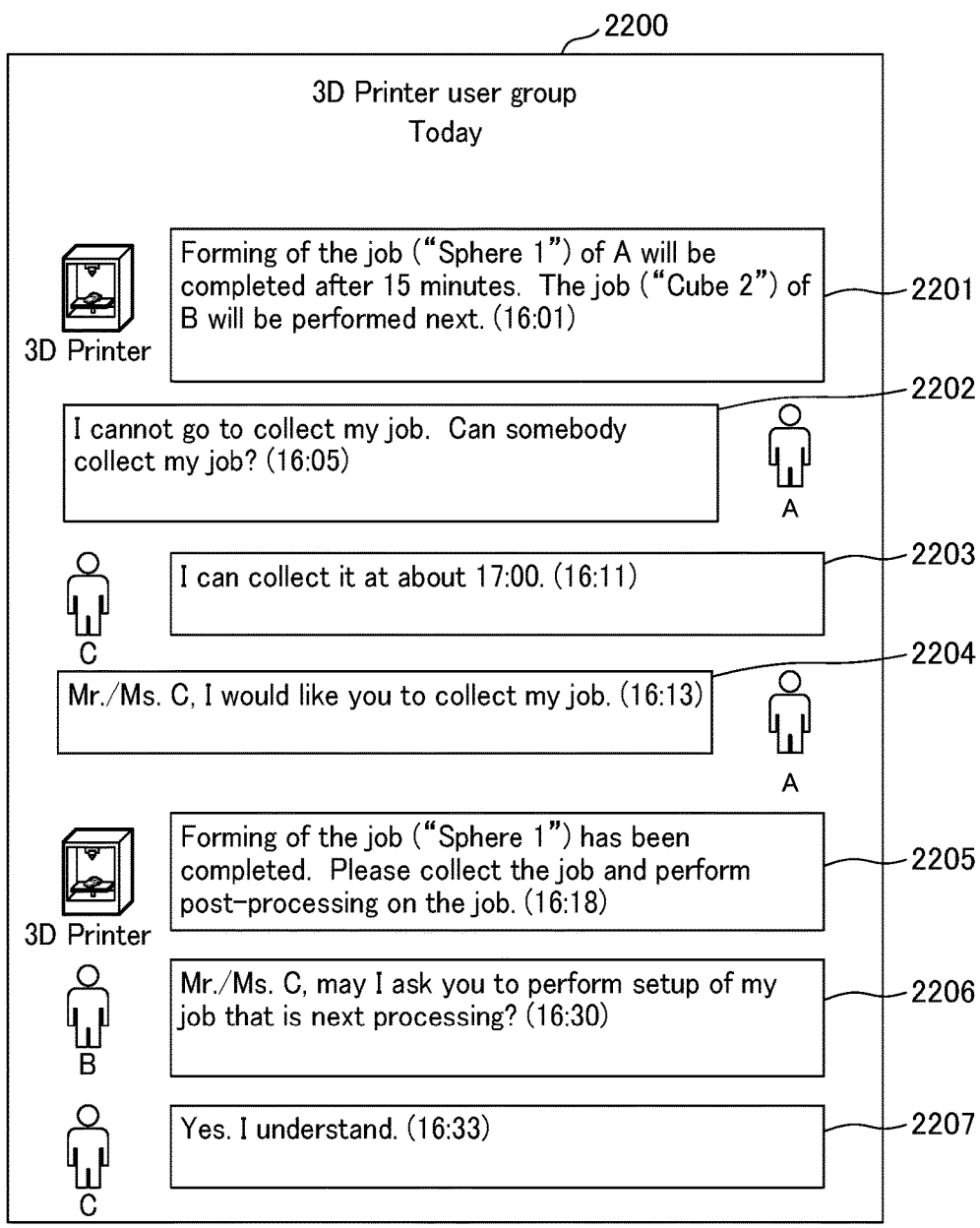
FIG. 9 is a diagram illustrating an example of a screen provided by the message service providing apparatus.

FIG. 9 illustrates an example of a screen displayed in a client terminal 104 of a user registered in the user group of the forming apparatus 100 as a result of distribution of a message in Step S1270.

Note that it is assumed that setting is performed so that the user can view or post messages exchanged with the user group of the forming apparatus 100 in advance in the embodiment.

A message 2201 or 2205 is a message related to the forming apparatus 100 or the forming job like in the first embodiment. In addition to this, it can be seen that messages related to the forming apparatus 100 and a plurality of forming jobs performed by the forming apparatus are shared among a plurality of users in the embodiment, as illustrated in FIG. 9. For this reason, for example, a user (Mr./Ms. A) for whom a forming job input by the user has been completed can request post-processing after forming from other users as in a message 2202.

Also, a user (Mr./Ms. B) of a forming job for which forming will be started after this can request pre-processing for the forming job of the user as in a message 2206. Another user (Mr./Ms. C) can receive the messages and perform required processing as indicated by a message 2203 or 2207 instead of Mr./Ms. A or Mr./Ms. B. Thus, when a plurality of forming jobs are performed, a vacant interval between the end of a forming job and a start of the next forming job can be prevented.

Description will be provided with reference to FIG. 7 again. Since the process of Step S1280 is the same as the process of Step S1180 in FIG. 5 in the first embodiment, description thereof will be omitted. When there is a forming job in which post-processing has been completed, the process proceeds to a process of Step S1290. In addition, when there is no forming job in which post-processing has been completed, the process returns to a process of Step S1210, and the print controller 312 continues to monitor a print queue and to monitor states of the forming apparatus and the forming job.

In Step S1290, the print controller 312 deletes user information of a user who has input a forming job in which post-processing has been completed from a user group registered in Step S1230. In other words, the user information of the user for the forming job registered in Step S1230 is erased from the user group when the post-processing for the forming job has been completed. This is because it is not necessary for the user to receive a new message due to the completion of the his/her forming job and continuing to receive unnecessary messages is prevented.

<Case in which Job Group is Used>

Figure 8A:
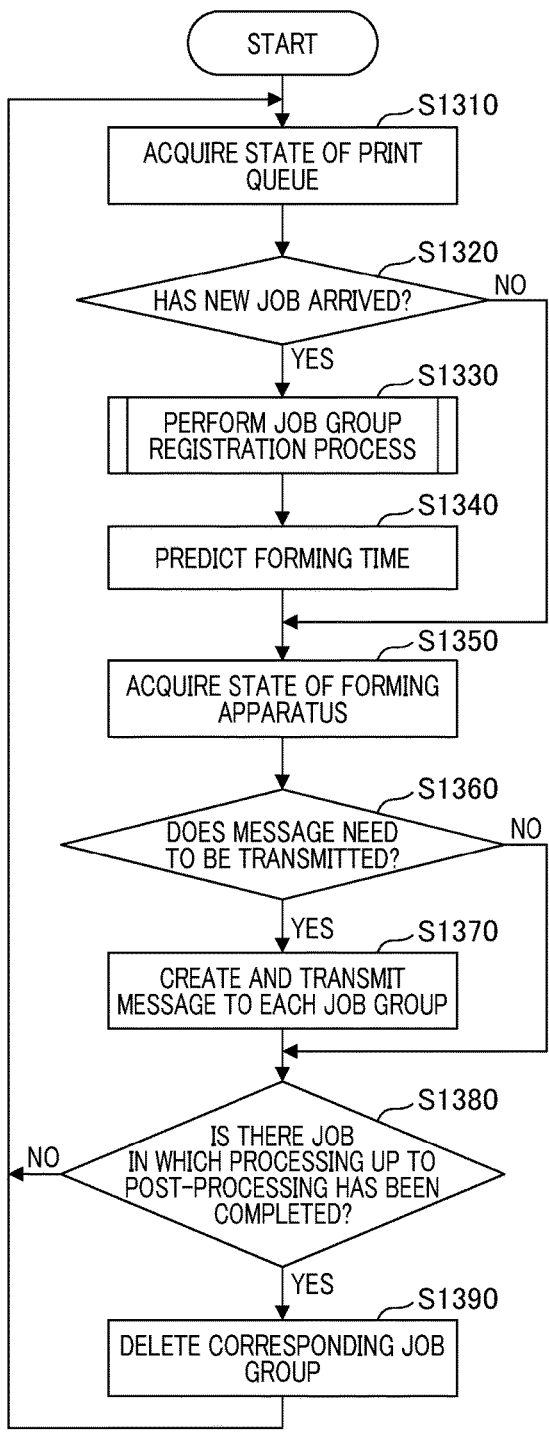
FIGS. 8A and 8B are flowcharts for describing a process of distributing a message using a job group.

FIG. 8A is a flowchart for describing a process in which the relay apparatus 102 registers a job group of the forming apparatus 100 using a group function of an SNS and distributes a message with respect to the job group.

Since processes of Steps S1310 and S1320 are the same as the processes of Steps S1110 and S1120 in FIG. 5 in the first embodiment, description thereof will be omitted. In Step S1330, the print controller 312 extracts user information of a user who has input a new forming job, that is, an owner of the forming job, from the confirmed new forming job. It is assumed that user information is, for example, an ID of an SNS in the embodiment. Moreover, the print controller 312 performs job group registration processing of registering the extracted user information in the job group. The job group registration processing will be described in detail below.

Figure 8B:
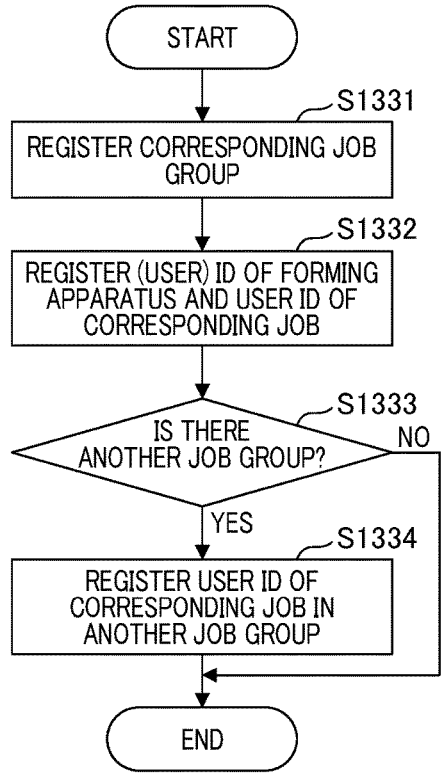
Figure 10:
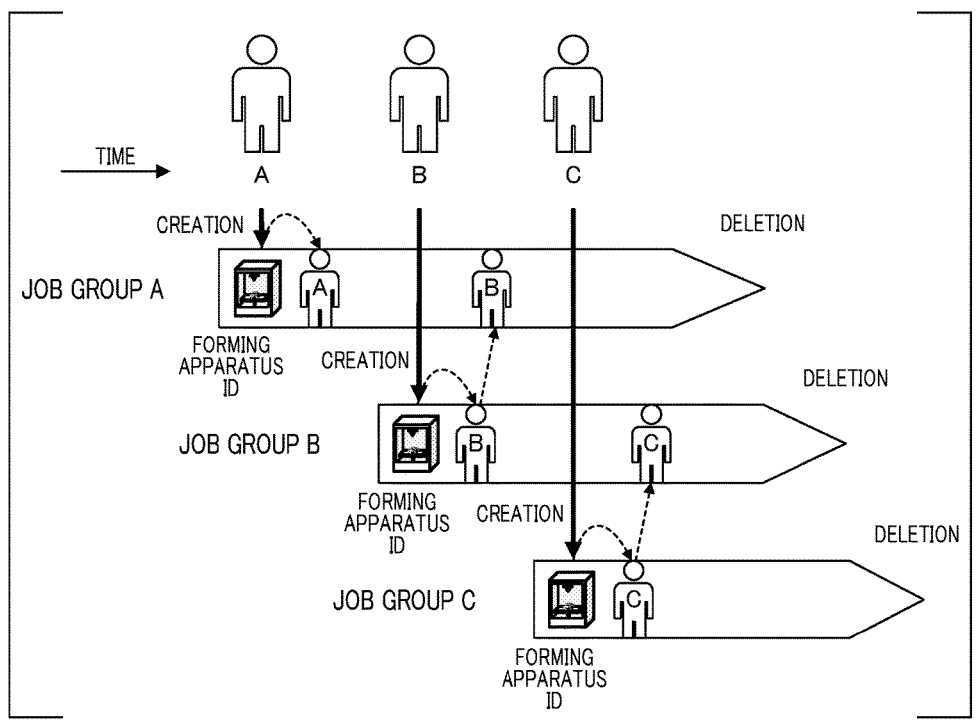
FIG. 10 is a diagram illustrating job group registration processing.

FIG. 8B is a flowchart for describing job group registration processing performed by the relay apparatus 102 in Step S1330. Furthermore, FIG. 10 is a diagram illustrating an example in a case in which job group registration processing is performed.

In Step S1331, the print controller 312 registers one job group in the message service providing apparatus 106 for each forming job confirmed in Step S1320 via the message service client 313 of the relay apparatus 102.

Processes of Steps S1333 and S1334 subsequent to the process of Step S1331 are performed for each registered job group here. In FIG. 10, a case in which users A, B, and C input forming jobs to a same forming apparatus 100 is exemplified. As illustrated in FIG. 10, it can be seen that job groups A, B, and C are registered as a result of the process of Step S1331 when each of the users inputs the forming job.

In Step S1332, the print controller 312 registers pieces of user information of the users who have input forming jobs corresponding to the job groups registered in Step S1331 and an account corresponding to the forming apparatus 100 performing the forming job in the job groups. Note that, like in the case of the first embodiment, an account corresponding to the forming apparatus 100 is actually an account for the relay apparatus 102 and the relay apparatus 102 exchanges messages with the users using the account of the forming apparatus 100.

In the example illustrated in FIG. 10, it can be seen that the pieces of user information of the forming apparatus 100 are registered in each registered job group and the user information of the user who has input the forming job corresponding to each job group is registered. For example, user information of the user A, user information of the user B, and user information the user C are registered in a job group A, a job group B, and a job group C, respectively.

In Step S1333, the print controller 312 determines whether or not the forming apparatus 100 in which the user information has been registered in Step S1332 is also registered in other job groups for each of the job groups registered in Step S1331. In other words, the print controller 312 determines whether or not there is another unfinished forming job for the forming apparatus 100 registered in the job group. When it is determined that the forming apparatus 100 registered in the job group is registered in another job group, the process proceeds to a process of Step S1334. In addition, when it is determined that the forming apparatus 100 registered in the job group is not registered in another job group, the process ends.

In the example illustrated in FIG. 10, when the forming job is input by the user A and the relay apparatus 102 has registered the job group A, the forming apparatus 100 registered in the job group A is not registered in another job group. In this case, the job group registration processing (Step S1330) ends.

On the other hand, when the forming job is input by the user B and the relay apparatus 102 has registered the job group B, the forming apparatus 100 registered in the job group B has already been registered in the job group A. In this case, the user information of the user B is registered in the job group A that is the job group corresponding to the forming job preceding the forming job of the user B.

Also, when the forming job is input by the user C and the relay apparatus 102 has registered the job group C, the forming apparatus 100 registered in the job group C has already been registered in the job group A and the job group B. In this case, the user information of the user C is registered in the job group B that is the job group corresponding to the forming job preceding the forming job of the user C.

In this way, in Step S1334, the print controller 312 registers the user information of the forming job corresponding to the job group registered in Step S1331 in a job group corresponding to a forming job that is performed before the forming job and consecutive with the forming job. In other words, the user who has input the forming job also has his/her user information registered in a job group corresponding to a preceding unfinished forming job performed by the same forming apparatus 100 in addition to the job group corresponding to his/her own forming job.

Thus, the user can view or post messages exchanged with the job group corresponding to the forming job preceding his/her own forming job via the message service client 343 of the client terminal 104.

When the job group registration processing of Step S1330 has been completed, the process proceeds to a process of Step S1340 in FIG. 8A. With regard to processes of Steps S1340 to S1380, description will be provided by assuming a case in which the "user group" in the processes of Steps S1240 to S1280 in FIG. 7 is replaced with a "job group". In Step S1390, the print controller 312 deletes the job group corresponding to the forming job that has been completed up to the post-processing.

This is because a new message does not need to be transmitted to the user who has registered the user information in Step S1332 and input the forming job. Also, regarding user information of other users included in the job group, no messages related to completed forming jobs are transmitted. Moreover, the other users continue to receive distribution of messages related to the forming apparatus 100 and his/her own forming job until the job group corresponding to his/her own forming job is deleted, that is, until the post-processing for his/her own forming job has been completed.

As described with reference to FIG. 7, when the user group is used, messages related to all forming jobs in "progressing process" and "standby process" states are shared with the user who has input the forming job in the forming apparatus 100 performing the forming job. However, when the number of forming jobs handled by the forming apparatus 100 increases, a forming job whose order of performance is later may be started, for example, three days, four days, or the like later in some cases even in the same "standby process" state. In such a case, it cannot be said that current messages concerning the forming apparatus 100 or the forming job are useful for a user who has input a forming job later in the performance order.

On the other hand, as described with reference to FIGS. 8A and 8B, when the job group is used, messages concerning the forming apparatus 100 or forming jobs of other users performed by the forming apparatus 100 are distributed after an estimated performance start time of a forming job of the user himself/herself is approached. For this reason, excessive distribution of messages to the user can be minimized even in a situation in which there are many forming jobs in "standby process" state.

Note that, although a case in which the user information of the user is registered in the job group corresponding to the forming job preceding the forming job input by the user in Step S1334 has been described in the embodiment, the present invention is not limited thereto. For example, when many small forming jobs which do not require a long processing time are handled in the forming apparatus 100, turnover of the forming jobs is very fast.

In such a case, since the messages relating only to the preceding forming job are shared and thus a period during which messages are shared is short, and only two users share the messages, and thus pre-processing or post-processing after forming may not be able to be performed at an appropriate timing in some cases. On the other hand, targets for the job group in which the user information of the user who input the forming job is registered may be extended to a job group corresponding to two or more forming jobs that are performed before the forming job and consecutive with the forming job.

In other words, the number of job groups in which the user information is registered can be changed and the user can freely set the number of job groups. Furthermore, the number of job groups in which the user information is registered cannot be set either in advance. For example, the print controller 312 may be configured to register the user information of the user in the job group corresponding to the forming job which can be performed within a predetermined time before the forming job of the user himself/herself is performed on the basis of a predicted forming time.

Note that, although a case in which the above-described user group and job group are registered using the group function of the SNS has been described in the embodiment, a registered group is not limited to these types. Furthermore, it is assumed that the user can arbitrarily set a specific group used to receive distribution of a message. The relay apparatus 102 may automatically perform switching to a specific group to which a message is distributed in accordance with an application of the forming apparatus 100.

In this way, the same effects as those of the first embodiment are attained in this embodiment. Furthermore, according to this embodiment, the messages related to the forming apparatus 100 and a plurality of forming jobs performed by the forming apparatus are shared among a plurality of users using the group function of the SNS.

Third Embodiment

In the first embodiment, the relay apparatus 102 distributes the message related to the forming apparatus 100 or the forming job to the user who has input the forming job. In other words, the message related to the forming apparatus 100 or the forming job is unilaterally transmitted from the relay apparatus 102 to the user in the first embodiment. For this reason, the user may not obtain necessary information at a necessary timing in some cases. On the other hand, it is assumed that the relay apparatus 102 can receive a request from the user using the SNS.

Note that it is assumed that a configuration, a hardware configuration, and a software configuration of a forming system according to the embodiment are the same as those of the first embodiment except that the software configuration of the message service providing apparatus 106 is different. Thus, in the embodiment, components that are the same as those of the first embodiment will be denoted with the same reference numerals and description thereof will be omitted.

Figure 11:
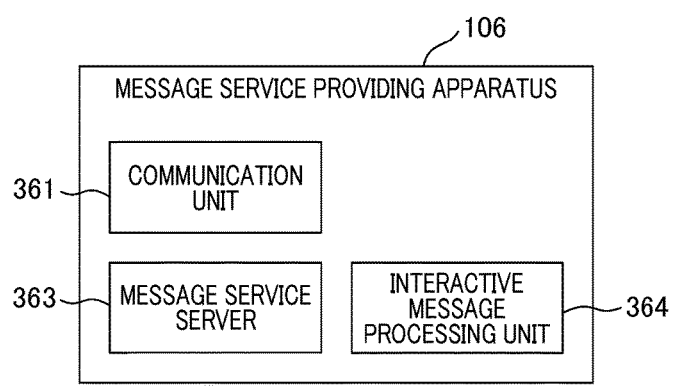
FIG. 11 is a diagram illustrating an example of a software configuration having an interactive message processing unit.

FIG. 11 is a diagram illustrating an example of a software configuration of a message service providing apparatus 106 according to the embodiment.

In the message service providing apparatus 106 in the embodiment, an interactive message processing unit 364 is added to a software configuration of the message service providing apparatus 106 in the first embodiment illustrated in FIG. 4.

The interactive message processing unit 364 performs control for responding to a message received from a message service client 343 of a client terminal 104 in response to a request of a message service client 313 of a relay apparatus 102. The interactive message processing unit 364 is a module which uses a so-called artificial intelligence technique for interpreting natural language and collects necessary information from other network devices or a database (DB) in response to a message.

Note that, when the relay apparatus 102 distributes a message to a user, it is assumed that a message is distributed to a user who has input a forming job on the basis of the first embodiment (FIG. 5) or the second embodiment (FIG. 7 and FIGS. 8A and 8B).

Figure 12:
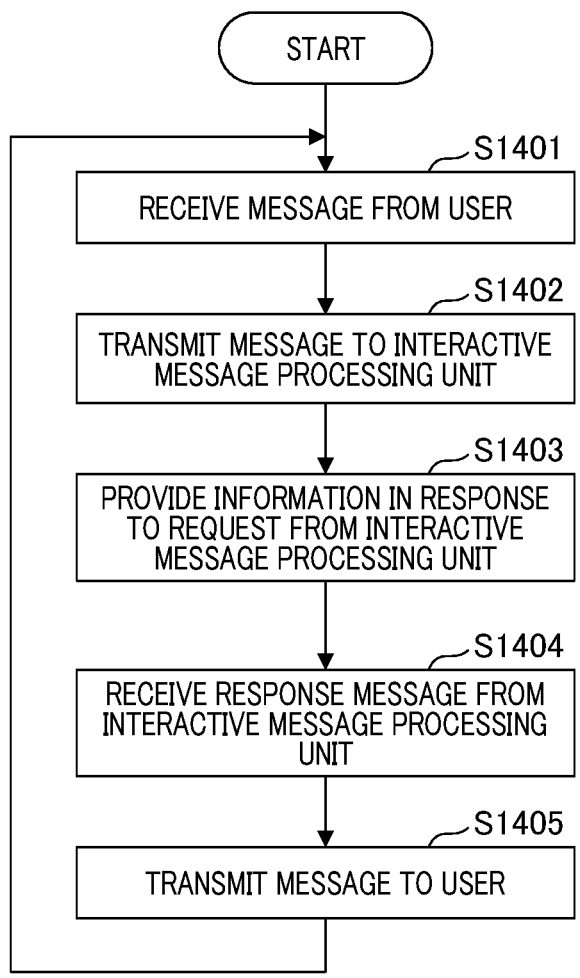
FIG. 12 is a diagram illustrating a process of responding to a question message from the user.

FIG. 12 is a flowchart for describing a process in which the relay apparatus 102 responds to a question message from the user.

In Step S1401, the message service client 313 of the relay apparatus 102 receives a message from the user. In Step S1402, the message service client 313 transmits the received message to the interactive message processing unit 364 via the message service server 363 of the message service providing apparatus 106.

The interactive message processing unit 364 interprets the received message and searches for information necessary for answering. In this case, since specific information related to a forming apparatus 100 and a forming job is needed, the main information source for the interactive message processing unit 364 is the relay apparatus 102. Thus, a callback as in Step S1403 occurs. Specifically, for example, in response to a question message such as how much time will be taken for a user's forming job to be executed, the following information may be requested from the relay apparatus 102.

The following question messages may be exemplified:

1) How long will it be until a predicted end time of a forming job currently being formed?

2) How long are the forming jobs currently in the print queue for the forming apparatus 100 executing the forming of a user job, and additionally what is the information relating to each forming job, a predicted forming time, and the like?

3) What is the average time until post-processing for a previously performed forming job has been completed until the next forming job is started or an average time from when forming has been completed until post-processing has been completed, for each of users who have input forming jobs in a current print queue?

The interactive message processing unit 364 may collect general information other than information concerning the forming apparatus 100 such as a remaining amount of consumables, the temperature, the humidity, or the like which can affect a forming time in addition that described above. The interactive message processing unit 364 can also collect a variety of information such as a day, a time period, or the like during which the user can access a place in which the forming apparatus 100 is installed. The interactive message processing unit 364 also creates a final response message on the basis of the various types of collected information.

In Step S1404, the message service client 313 of the relay apparatus 102 receives a response message from the interactive message processing unit 364. In Step S1405, the message service client 313 transmits the response message received from the interactive message processing unit 364 to the user via the message service server 363.

FIG. 13 illustrates an example of a screen displayed in the client terminal 104 of the user who has input a forming job and transmitted a question message as a result of performance of the process illustrated in FIG. 12.

A message 2301 is a question message of the user A. A message 2302 is a response message transmitted from the relay apparatus 102 as a result of performance of the processes illustrated in FIG. 12.

Also in the embodiment, the relay apparatus 102 distributes messages 2303 to 2306 concerning the forming apparatus 100 and the forming job like in the first embodiment and the second embodiment. For example, messages concerning states of materials used in the forming apparatus 100 are distributed like the message 2305 or the message 2306. Note that the interactive message processing unit 364 may be configured to more quickly and preferentially distribute information concerning a forming job of a user who has transmitted a question message earlier in the embodiment. Thus, a forming job of the user A can be performed more quickly and efficiently.

Note that, although it is assumed that the interactive message processing unit 364 is configured to included in the message service providing apparatus 106 in the embodiment, the present invention is not limited thereto and the interactive message processing unit 364 may be included in the relay apparatus 102. In this case, when the message service client 313 of the relay apparatus 102 receives a message from the user in Step S1401, a process including creation of a response message is performed in the relay apparatus 102. Moreover, in Step S1405, the created response message is transmitted to the user via the message service server 363.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-078444, filed Apr. 11, 2017, which is hereby incorporated by reference wherein in its entirety.

What is claimed is:

1. A relay apparatus that is connected to a forming apparatus which forms a three-dimensional object, the relay apparatus comprising;

a memory storing instructions; and a processor executing the instructions causing the relay apparatus to:

receive a forming request for the forming apparatus, which includes user information, from a client terminal;

perform a registration process to a message service, in response to reception of the forming request including the user information, so that a group, which includes at least the user information and an account of the relay apparatus, is managed by the message service; and distribute a message concerning the forming apparatus and the forming request for the group, wherein, in the registration process, in response to a reception of a first forming request including first user information, a first group, which includes the first user information and the account of the relay apparatus, is automatically registered to the message service, and wherein, in the registration process, the first user information is further registered in addition to a second group that has been a target of a registration process in response to a reception of a second forming request that is different from the first forming request and is managed by the message service.

2. The relay apparatus according to claim 1, wherein the instructions further cause the relay apparatus to perform automatic deletion of the group that has been a target of the registration process by the relay apparatus and is managed by the message service.

3. The relay apparatus according to claim 2, wherein the automatic deletion is performed if a post-processing for forming according to the forming request has been completed in the forming apparatus.

4. The relay apparatus according to claim 2, wherein the automatic deletion is performed on a group that has been a target of the registration process performed in response to the reception of the forming request in which a post-processing in the forming apparatus has been completed.

5. The relay apparatus according to claim 1, wherein the message to be distributed is a message concerning a state of a material used in the forming apparatus.

6. The relay apparatus according to claim 1, wherein the message to be distributed is a message concerning an estimated start time for forming according to the received forming request.

7. The relay apparatus according to claim 1, wherein the group includes a plurality of user information that are owners of consecutive forming requests.

8. The relay apparatus according to claim 1,
wherein, in the registration process, a group including the account of the relay apparatus is automatically registered to the message service.

9. A method for controlling a relay apparatus that is connected to a forming apparatus which forms a three-dimensional object, the method comprising:
receiving a forming request for the forming apparatus, which includes user information, from a client terminal;
performing a registration process to a message service, in response to reception of the forming request including the user information, so that a group, which includes at least the user information and an account of the relay apparatus, is managed by the message service; and
distributing a message concerning the forming apparatus and the forming request for the group,
wherein, in the registration process, in response to a reception of a first forming request including first user information, a first group, which includes the first user information and the account of the relay apparatus, is automatically registered to the message service, and
wherein, in the registration process, the first user information is further registered in addition to a second group that has been a target of a registration process in response to a reception of a second forming request that is different from the first forming request and is managed by the message service.

10. A non-transitory storage medium on which is stored a computer program for making a computer execute a method, the method comprising:
connecting to a forming apparatus which forms a three-dimensional object;
receiving a forming request for the forming apparatus, which includes user information, from a client terminal;
performing a registration process to a message service, in response to reception of the forming request including the user information, so that a group, which includes the user information, user information of other users, and an account of the relay apparatus, is managed by the message service; and
distributing a message concerning the forming apparatus and the forming request for the group,
wherein, in the registration process, in response to a reception of a first forming request including first user information, a first group, which includes the first user information and the account of the relay apparatus, is automatically registered to the message service, and
wherein, in the registration process, the first user information is further registered in addition to a second group that has been a target of a registration process in response to a reception of a second forming request that is different from the first forming request and is managed by the message service.

* * * * *